June 12, 1951     G. M. BICKNELL     2,556,463
CARBURETOR FOR SUBMERSIBLE VEHICLES Filed Dec. 26, 1944     5 Sheets-Sheet 1

INVENTOR.
George M. Bicknell
BY
George R. Ericson

June 12, 1951 G. M. BICKNELL 2,556,463
CARBURETOR FOR SUBMERSIBLE VEHICLES
Filed Dec. 26, 1944 5 Sheets-Sheet 2
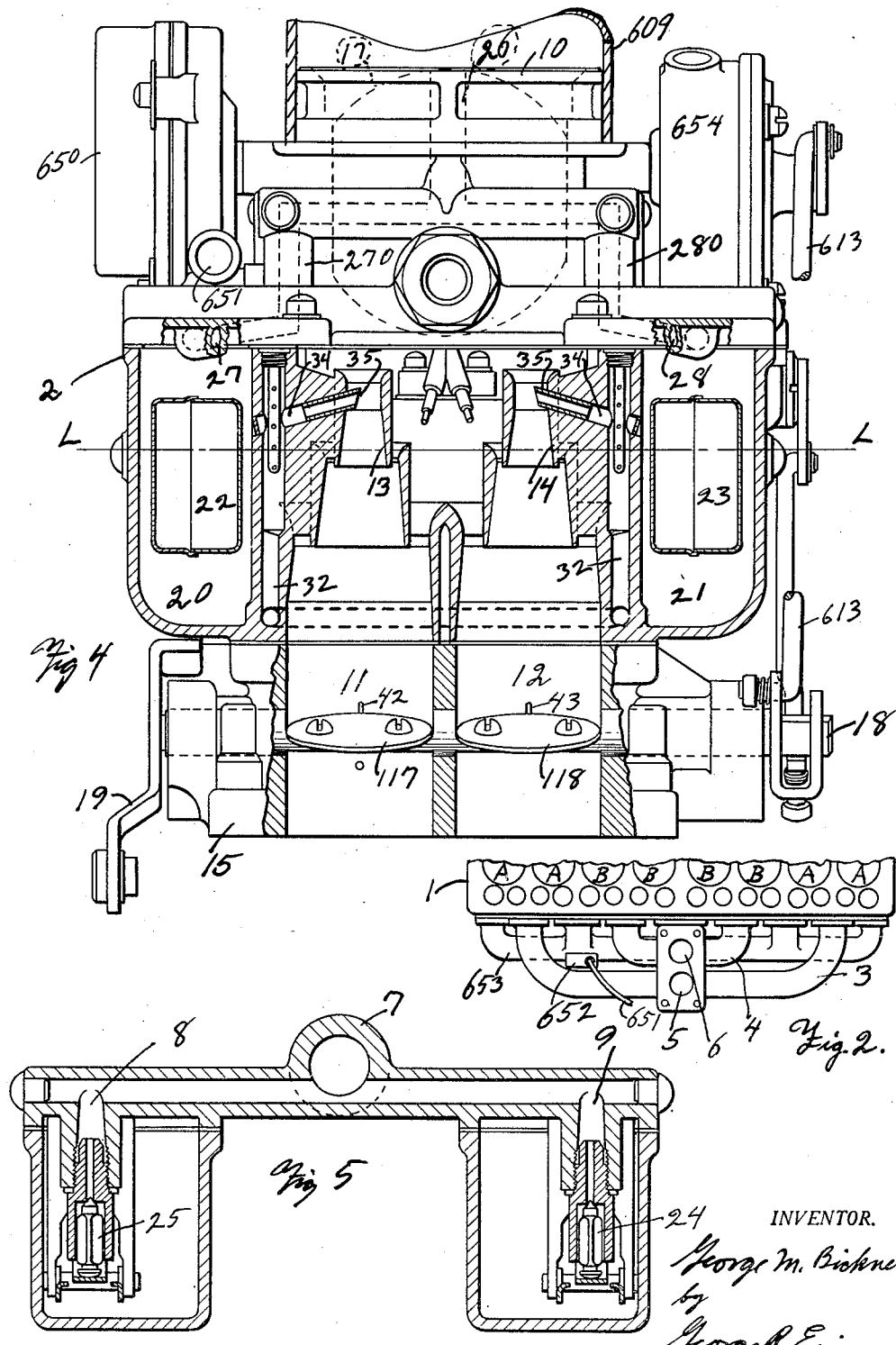
INVENTOR.
George M. Bicknell
by
George R. Ericson June 12, 1951 G. M. BICKNELL 2,556,463
CARBURETOR FOR SUBMERSIBLE VEHICLES
Filed Dec. 26, 1944 5 Sheets-Sheet 3

INVENTOR
GEORGE M. BICKNELL
Donald U. Rich
ATTORNEY

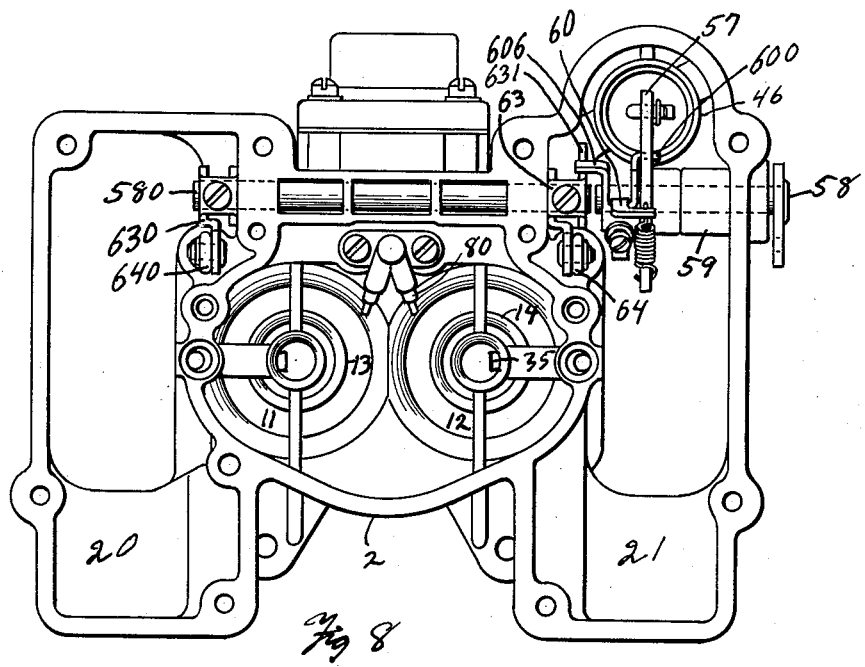

June 12, 1951 G. M. BICKNELL 2,556,463
CARBURETOR FOR SUBMERSIBLE VEHICLES
Filed Dec. 26, 1944 5 Sheets-Sheet 5

INVENTOR.
George M. Bicknell
BY
George R. Ericson

Patented June 12, 1951

2,556,463

UNITED STATES PATENT OFFICE 2,556,463

CARBURETOR FOR SUBMERSIBLE VEHICLES

George M. Bicknell, St. Louis, Mo., assignor to Carter Carburetor Corporation, St. Louis, Mo., a corporation of Delaware Application December 26, 1944, Serial No. 569,851

7 Claims. (Cl. 123—127)

This invention relates to internal combustion engines for motor vehicles, particularly tanks and other military vehicles which have to be operated partially submerged, and at widely varying angles of tilt and climb. In these vehicles it is absolutely essential to seal the carburetor against the admission of water. It is also necessary to prevent the engine being completely drowned out due to the fuel in the carburetor overflowing into the engine by gravity, or starving the fuel mixture by lowering the fuel level with respect to the nozzle to such a point that the engine cannot operate satisfactorily.

Numerous efforts have been made to produce a satisfactory all angle carburetor of the suction operated spray fuel nozzle type, employing a constant level chamber, but I do not know that any of these efforts have been successful prior to my invention. Also, I do not know that any submersible carburetors have been built. The standard of performance demanded for military vehicles requires the vehicle to operate while climbing or descending a 60% grade and while laterally tilted at angles up to 30° in either direction. Under these conditions it is impossible to maintain a satisfactory fuel level with respect to the fuel nozzle outlet with the result that the fuel mixture is sometimes too lean and sometimes too rich and at the extreme angles mentioned the engine may not run at all. It may be noted that while such angles of operation are not ordinarily required for ordinary passenger automobiles, similar conditions of operation may be produced during acceleration and deceleration and while rounding curves so that my invention is applicable to passenger automobiles as well as military vehicles.

In order to solve the above mentioned problems I have provided the internal combustion engine which drives the vehicle with a plurality of cylinder groups served by separate intake manifolds which are supplied with fuel mixture by a sealed twin carburetor installation having separate fuel chambers and nozzles oppositely disposed and positioned with respect to the mixing conduits so that if the engine is tilted in either direction so as to cause fuel to overflow into one group of cylinders, the fuel supplied to the other cannot simultaneously be increased, and the engine can be kept operating on at least half of its cylinders until the vehicle can be righted sufficiently to permit normal operation of both groups of cylinders.

I have made a further improvement by bringing the fuel nozzles up vertically to a point at or slightly above, the fuel level and introducing an air-bleed at that point, before it enters a lateral extension of the fuel nozzle leading into the mixture conduit. This bent nozzle construction is beneficial in two ways, first, the "overflow point" or bend of the nozzle is located directly adjacent the fuel in the float chamber so that there is only a slight rise in the level of the fuel in the nozzle when the carburetor is tilted in a direction tending to pour fuel out of the nozzzle as, for instance, water would be poured from the spout of an ordinary tea-kettle. The introduction of the air-bleed at the overflow point, that is at the highest point in the spout or nozzle when it is in a tilted position, prevents the outlet portion of the nozzle from setting up a syphon action which would continue the flow once it has been started.

The other advantage of having the air-bleed at the intersection of the vertical and angular portions of the nozzle is that when the carburetor is tilted in a direction to raise the nozzle outlet with respect to the fuel chamber, the suction only has to lift emulsion or spray instead of solid fuel. This emulsion or spray may be lifted by the air stream much more easily than a solid column of fuel, so that there is a minimum of interference with the richness of the mixture when the fuel is tilted.

I have made another improvement in making the dimensions of the individual float chambers as small as possible in the plane which passes through the nozzle and the axis of the mixing conduit, while making up the necessary volume with an increase in the fore and aft dimension, which is perpendicular to that plane and parallel to the normal direction of travel of the vehicle.

I have further minimized the change in the fuel supply by cutting down the height and capacity of the float chamber above the fuel level and sealing the float chamber with a cover so as to prevent substantial flow of the fuel away from the fuel nozzle when the vehicle is climbing a steep grade.

In designing the carburetor according to my invention, I have produced another improvement in the simplicity and convenience of assembly and adjustment, particularly as to mounting of the parts in such a manner that the bowl cover, air horn, fast idle, automatic choke and float mechanism can be removed as a unit without disturbing the adjustment and arrangement of the accelerating pump, metering rods and fuel step-up devices, except for removing the connections between the throttles and these elements.

An important feature of the construction is the elimination of unprotected air vents which could admit water when the carburetor is submerged, and which might cause the operation of the carburetor to be interfered with by the collection of dirt and dust under ordinary operating conditions. This feature is of particular importance in military use.

I have made numerous other improvements in principle and arrangement which will more fully appear from the following description and the accompanying drawings referring to which Fig. 1 is a diagrammatic side elevation of a vehicle engine having my invention applied thereto.

Fig. 2 is a diagrammatic plan view of parts of the engine shown in Fig. 1, the cylinder head and carburetor being removed to show the arrangement of cylinder groups.

Fig. 4 is a view corresponding to Fig. 3 with the twin carburetor is upright position.

Fig. 5 is a diagrammatic sectional elevation of the fuel inlet passage and needle valve mechanism taken along the line 5—5 of Fig. 6.

Fig. 7 is a partial sectional elevation taken along lines 7—7 of Fig. 6.

Fig. 8 is a plan view of the twin carburetor with the bowl cover and upper assembly removed to show the mechanism which is mounted on the main body member.

Figure 1:
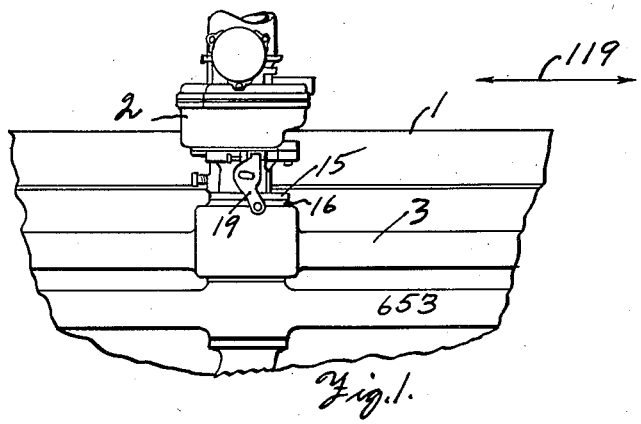

The reference numeral 1 indicates a vehicle engine having a plurality of cylinder groups, the individual cylinders of which groups are indicated by the reference characters A and B, respectively. The engine is of the well known four-cycle internal combustion type, and the firing order of the engine is preferably so arranged as to cause the cylinders of the two groups to fire alternately at substantially equally spaced intervals, so as to maintain a substantial continuity of suction impulses in the common air inlet of the twin carburetors, generally indicated by the reference numeral 2 and connected to supply the cylinders with fuel mixture separately through the intake manifolds 3 and 4. It will be understood that the mixture outlets of the twin carburetors are connected to the inlets 5 and 6 of these manifolds separately.

The twin carburetor is formed in a single integral unit having a common air inlet horn 10 connecting the separate mixture induction conduits generally indicated at 11 and 12, each including one or a series of co-axial Venturi tubes 13 and 14. The lower part of the carburetor is provided with a flange 15 by means of which it is bolted to the corresponding flange 16 on the intake manifolds 3 and 4, these being formed integrally in the preferred construction. The air horn 10 serves as an inlet for both mixing conduits, and a common choke valve 17 is provided to restrict the admission of air for starting purposes.

The quantity of mixture supplied to the cylinder groups is controlled by a pair of butterfly throttles, 117 and 118 mounted on shaft 18 to which is secured a crank 19. This crank is connected to the usual manually operated accelerator pedal or other suitable control.

It will be noted that the separate manifolds 3 and 4 are parallel and have their longest dimension in a direction parallel with the normal travel of the vehicle as indicated by the arrow 119 in Fig. 1. The manifold inlet ports 5 and 6 are parallel in a vertical plane perpendicular to the normal line of travel. The two mixing conduits 11 and 12 are substantially vertical and co-axial with the manifold inlets 5 and 6.

Figure 3:
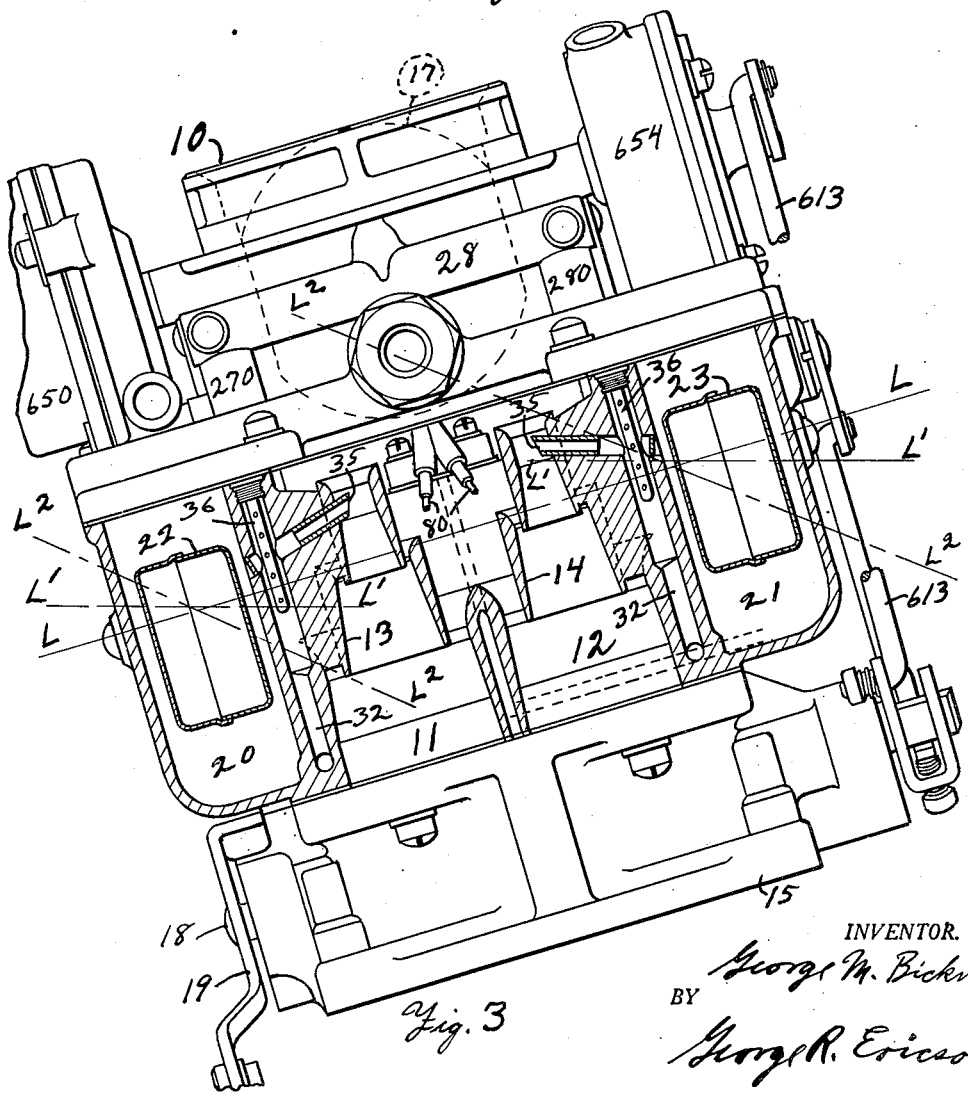
Fig. 3 is a front elevation, partly in section, of a sealed twin carburetor according to my invention shown in a tilted position to indicate the operation when the vehicle is tilted sidewise on a 20% grade.
Figure 6:
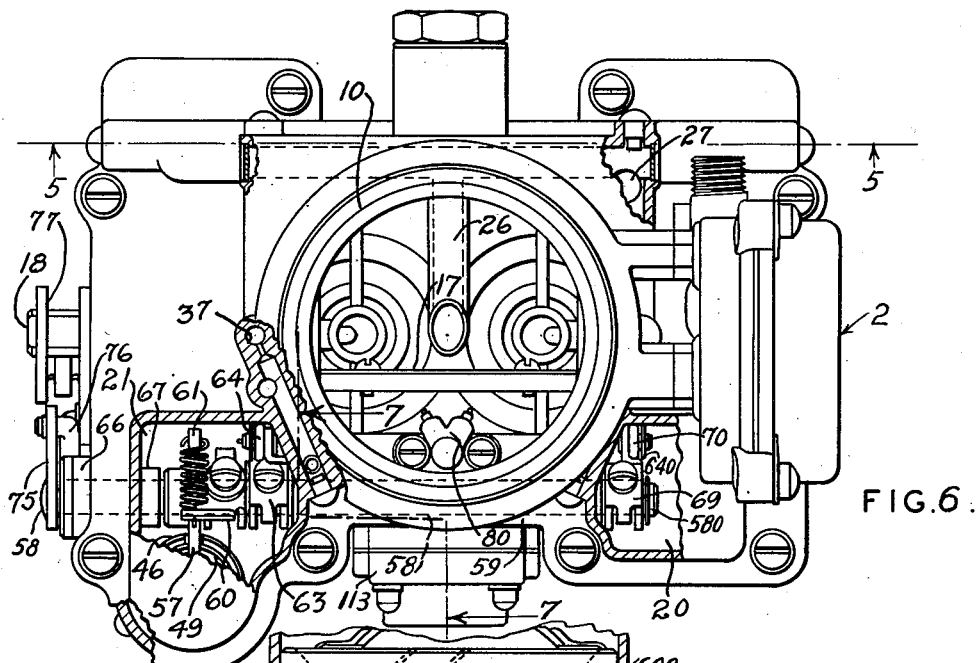
Fig. 6 is a plan view of the twin carburetor installation with parts broken away and others shown in section.

Separate float chambers 20 and 21 are provided for the mixing conduits 11 and 12, respectively. Floats 22 and 23 are mounted in the float chambers, each independently operating one of the needle valves 24 and 25 to control the admission of fuel through the single fuel inlet connection 7, which is branched at 8 and 9 to supply fuel to the two chambers separately. The float mechanism and needles are so adjusted as to maintain a normal fuel level substantially as indicated by the line L—L in Figs. 3 and 4.

The reservoirs 20 and 21 have no connection through which fuel could flow from one to the other under any operating condition. The upper parts of the float chambers are vented only through the passages 27 and 28, which extend through ribs 270 and 280 to the vent tube 26 which is vented to the air horn at a point anterior to the choke valve 17.

The main fuel supply for each mixing conduit is drawn from the respective float chamber through a main metering jet 30. A cross passage 31 conducts the fuel from each metering jet to a vertical passage 32 which extends upwardly in a plane passing through the axes of the two mixing conduits to a point slightly above the normal fuel level, through a rib structure 33 on the inside wall of the reservoir. This keeps the passage 32 as near as possible to the center of volume of the reservoir although it is not practicable to have it exactly in the center on account of the float which is located in that position. At the top of the vertical portion of the fuel passage 32 it is joined by a passage 34 which is inclined at an angle of approximately 17° (corresponding to the maximum angle tilt experienced in normal operation) and this passage terminates in a nozzle 35 which carries the fuel to the smallest venturi into which it discharges by suction.

In order to prevent the formation of a syphon and to minimize the weight of the fuel column in the angular portion of the passage, I provide an air inlet or bleed tube 36 to admit air from a passage 37 (Fig. 11) to the fuel just before it reaches the junction of the vertical and angular portions of the main fuel passage. The air tube 37 is connected to the vent tubes 26 and 28 previously described.

Idling fuel for each mixing conduit is supplied through a vertical passage 40 (Fig. 11) which connects with corresponding cross passage 31 and is provided with a metering tube 41. Idling passages, portions of which are indicated at 42 and 43, extend to the usual idling ports adjacent the edges of the throttle valves. A restricted idling air bleed passage is shown at 44 opening into air duct 37 which connects with the vent tube 28.

An accelerating pump cylinder 46 is integrally formed by die-casting as a vertical projection from the lower part of the reservoir 21. Piston 47 having an expansible cup packing 48 and guided by a sheet metal cup 49 is mounted in the cylinder. The leather or synthetic rubber cup 48 is clamped against a shoulder 50 on piston rod 51 by the riveted end 52 of the rod. The piston rod 51 is connected by link 56 to the lever 57 which is rotatably mounted on shaft 58, which in turn is mounted in a bearing 59 in the outer wall of reservoir 21 (Fig. 8).

Figure 11:
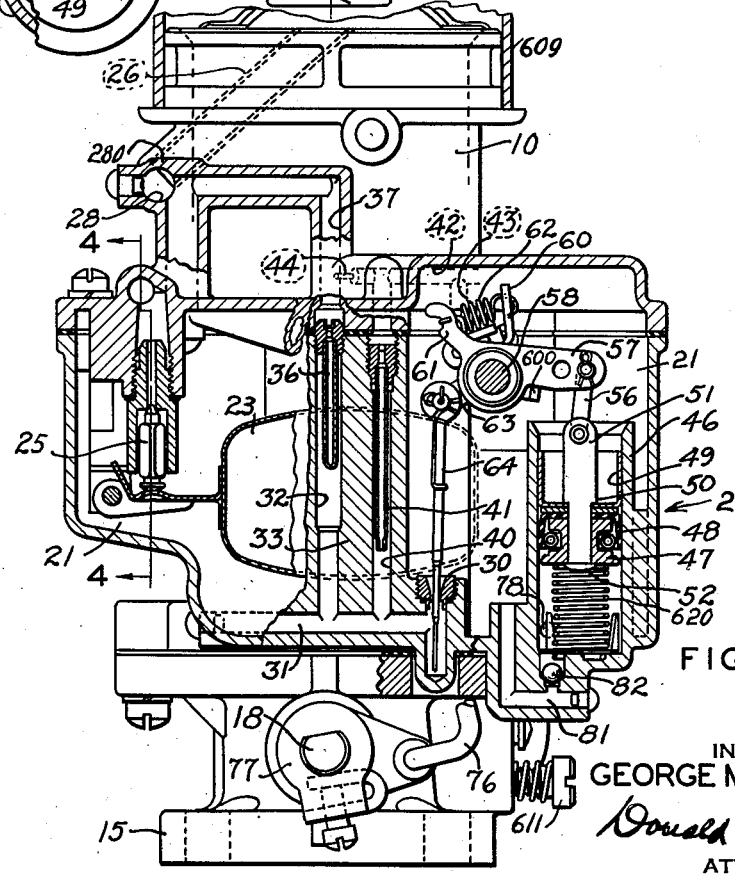
Fig. 11 is a sectional elevation of the carburetor, one of the fuel reservoirs and accelerating pump being shown in section.
Figure 9:
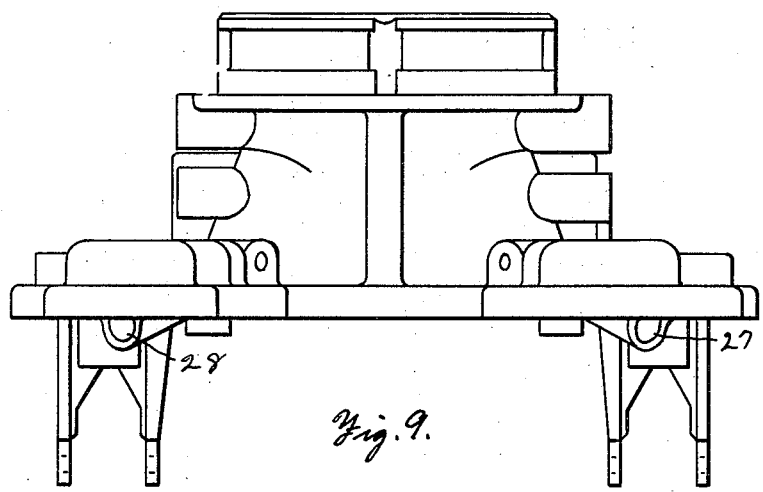
Fig. 9 is an elevation of the bowl cover.
Figure 10:
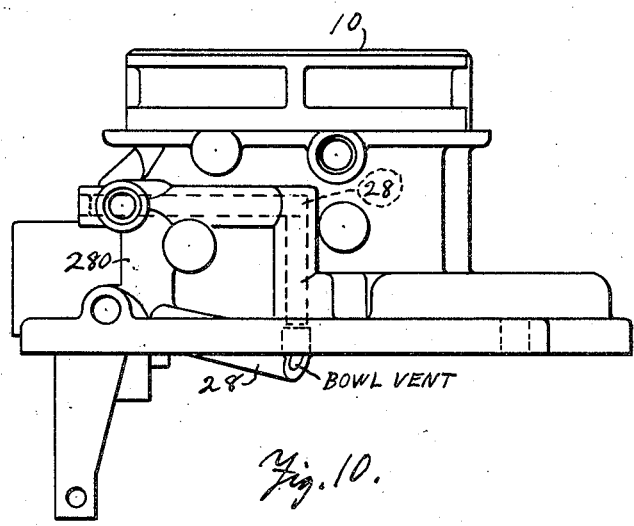
Fig. 10 is a side view of the bowl cover shown in Fig. 9.

An arm 60 which is rigidly mounted on shaft 58 is connected to a finger 61 on lever 57 by means of a tension spring 62. This spring is pretensioned by reason of a finger 600 which is attached to the lever 60 and bent under the lever 57 as shown in Figs. 8 and 11. The relative strengths of the springs 62 and 620 beneath piston 47 are such that while the latter is sufficient to take up any slack in the piston linkage, it is completely compressed before the spring 62 begins to yield. By this arrangement the complete stroke of the piston occurs during the first part of the throttle opening movement and the spring 62 merely yields during the last part of the throttle opening movement. It will be noted that the throttle shaft 13 is provided with a lever 77 which is connected to the operating arm 75 of the shaft 58 by means of a link 76.

The accelerating pump is provided with an inlet passage 81 leading from the fuel reservoir 21 and an inlet check valve 82. The pump is also provided with outlet passages 78 and 79 which lead laterally and vertically to a header having branched outlets 80 directed to discharge accelerating jets of fuel against the outer walls of the secondary venturis 13 and 14, so that the accelerating fuel supply to both of the mixing conduits is supplied by a single accelerating pump.

A second shaft 580 in line with and not larger than the shaft 58 is mounted in the main casting, and extends into the chambers 20 and 21 (Fig. 8).

A lever 63 is fixed to the shaft 580 and pivotally supports the metering rod 64 in the reservoir 21. A similar metering rod 640 is mounted in the chamber 20 to control a similar fuel supply to the mixing conduit 11. The metering rod 640 is operated by a lever 630 rigidly mounted on the rod 580.

The lever 60 is provided with a bent over projection 606 (Fig. 8) which is capable of contacting a projection 631 on the lever 63. In this manner the shaft 580 may be rotated in clockwise direction with respect to Fig. 11 when the throttle valve is moved to open position. It will be noted that the clockwise movement with respect to Fig. 11 would be anti-clockwise with respect to Fig. 7.

The shaft 580 is normally urged clockwise with respect to Fig. 7 by a vacuum applied from a point posterior to the throttle through the passage 110 to act on a diaphragm 111 which is connected by a link 112 to a lever 113 rigid with the central portion of shaft 580. The diaphragm is provided with a vacuum chamber cover 113 containing a spring 114 which tends to shift the diaphragm to the right with respect to Fig. 7 and to rock metering rod shaft 580 counterclockwise to lift the metering rods and enrich the mixture when the vacuum in the mixing conduits posterior to the throttle is below approximately 5" of mercury. Regardless of the vacuum in passage 110, finger 606 contacts extension 631 and causes the shaft 580 to be moved to its anti-clockwise position and raise the metering rods to the rich position whenever the throttle is fully opened.

One of the features of this invention is the completely sealed construction whereby no air vents or inlets are formed in the carburetor, and the engine may actually be operated under water, provided the air horn 10 is not actually submerged. Extreme conditions of high water may be met by providing air horn 10 with an upward extension 609 which may lead to any desired level. In order to make this possible the fuel system air bleeds are all led to the inside of the carburetor and to the vents 26 and 28 as previously described. The idle adjusting screw 611 operates as a fuel or emulsion valve only. The bowl cover completely seals the upper part of the carburetor so that nothing can enter except through the air inlet member 609, which may of course be provided with the usual air cleaner to prevent the admission of dust and dirt.

While the choke valve 17 may be operated in any suitable manner, it is preferred to use an automatic choke construction of the type shown in the Coffey Patent 2,325,272, issued July 27, 1943. The mechanism for this control is preferably contained in the housing 650 which is provided with a hot air connection in 651 leading from a stove 652 on a hot portion 653 of the engine.

Suitable mechanism for insuring the partial opening of the throttle when the choke is closed and for partially opening the choke when the throttle is fully opened is contained in the housing 654. The details of this mechanism are not shown as they do not form a necessary part of the present invention.

The invention may be modified as will occur to those skilled in the art and the exclusive use of all modifications as come within the scope of the appended claims is contemplated.

I claim:

1. In a carburetor, means forming a fuel chamber, an accelerating pump cylinder connected to said chamber, a rock shaft arranged in the chamber and mounted in the wall thereof, means connected with said rock shaft for operating said pump, a fuel control device, an operating shaft for said fuel control device journaled in a wall of said fuel chamber and concentric with said rock shaft, yielding means for operating one of said shafts and means carried by one of said shafts for operating the other.

2. In a carburetor, means forming parallel mixing conduits, a fuel control device for each of said mixing conduits, wall structure separating said conduits, a rock shaft journaled in said wall structure for operating said device, an accelerating pump, an operating shaft for said accelerating pump concentric with said rock shaft, said rock shaft being movable independent of said pump shaft, said rock shaft being rotatably mounted on said operating shaft and openings in the outer wall of said carburetor through which both of said shafts may be inserted or removed.

3. In a motor vehicle adapted to be operated at widely varying angles, an internal combustion engine having a plurality of cylinder groups, separate manifolds for said groups having adjacent inlets, a carburetor associated with said engine for supplying a fuel mixture to said manifolds including a casing having sealed therein against the admission of air, separate fuel supply devices for manifolds, each fuel supply device comprising a mixing conduit, a float chamber and a fuel supply nozzle leading from said float chamber to its mixing conduit, each of the outlets of said fuel supply nozzles being normally above the level of fuel in the respective fuel supply chambers but being adapted to be tilted to a position below the level assumed by the fuel when the vehicle is tilted in one direction, the outlets of said fuel supply nozzles being so laterally spaced in opposite directions from the respective fuel chambers that one of the outlets will be above the fuel level for feeding fuel to one bank of cylinders when the other has been submerged due to a tilting of the carburetor beyond a predetermined critical angle, whereby one group of cylinders will always be supplied by a carburetor having its fuel nozzle above the level of fuel in its float chamber and an induction passage above said carburetor for supplying air thereto.

4. In a carburetor adapted to be operated in varying angular positions a pair of downdraft fuel mixture conduits, venturis in said conduits, a constant level fuel supply chamber for each of said conduits, a main fuel nozzle leading from each of said constant level chambers and having an outlet in the corresponding mixture conduit slightly above the normal fuel level when the carburetor is in upright position, said nozzles extending in laterally opposite directions whereby one of said nozzle outlets will remain above the fuel level in its respective supply chamber during lateral tilting of the carburetor, each of said nozzles comprising a vertical portion directly adjacent the fuel chamber and extending upwardly to a point above the fuel level in said chamber and a portion extending laterally from said point to the nozzle outlet in the venturi, and means to admit air to said nozzle above the normal fuel level therein whereby the formation of a siphon is prevented when the carburetor is tilted at such an angle that the nozzle outlet is below the fuel level in the chamber.

5. In an internal combustion engine having a plurality of cylinder groups, separate manifolds for said groups each having separate inlets, a carburetor for supplying independently metered fuel to each of said inlets, an independently controlled fuel source for each metering means, an accelerating pump for supplying fuel to both inlets, means for controlling the metering means from manifold suction, manual means for actuating said metering means, a casing enclosing said carburetor and sealing same against air leakage, said casing enclosing the entire carburetor structure, and means for admitting air to the carburetor through the upper face of the casing.

6. In an internal combustion engine having a plurality of cylinder groups, separate manifolds for said groups, each having a separate inlets, a carburetor for supplying independently metered fuel to each of said inlets, an independently controlled fuel source for each metering means, an accelerating pump for supplying fuel to both inlets, a casing enclosing said carburetor and sealing same against air leakage, means for admitting air to the carburetor through the upper surface of the casing, a rock shaft, means mounted thereon and actuated by said shaft for operating said metering means and accelerating pump, the portion of said shaft carrying such means being sealingly enclosed within said casing, means mediate of said shaft and enclosed within said casing for operating said shaft from manifold suction, and manual means for actuating said shaft.

7. In an internal combustion engine having a plurality of cylinder groups, separate manifolds for said groups each having a separate inlet, a carburetor comprising a single downwardly directed air inlet passage, separate mixture conduits registering with said air inlet passage, separate constant level fuel supply chambers, a fuel nozzle for supplying independently metered fuel from each of said fuel chambers to one of said conduits, means for supplying air from said air inlet passage to said fuel supply chambers and to said fuel nozzles, an accelerating pump for supplying fuel to both conduits, means for controlling the metering means by manifold suction, manual means for actuating said metering means, a casing enclosing said carburetor and sealing same against air leakage, said casing enclosing the entire carburetor structure, and means for admitting air to said air inlet passage through the upper face of the casing.

GEORGE M. BICKNELL.

REFERENCES CITED

The following references are of record in the file of this patent:

UNITED STATES PATENTS

| Number | Name | Date |
|--------|------|------|
| 1,620,827 | Mock et al. | Mar. 15, 1927 |
| 2,061,494 | Weber | Nov. 17, 1936 |
| 2,076,606 | Winter | Apr. 13, 1937 |
| 2,119,885 | Moore | June 7, 1938 |
| 2,199,276 | Barkeij | Apr. 30, 1940 |
| 2,207,533 | Chaffin | July 9, 1940 |
| 2,208,702 | Read | July 23, 1940 |
| 2,212,926 | Wirth | Aug. 27, 1940 |
| 2,240,194 | Olson | Apr. 29, 1941 |
| 2,246,825 | Winfield | June 24, 1941 |
| 2,252,120 | Ericson | Aug. 12, 1941 |
| 2,271,116 | Bracke et al. | Jan. 27, 1942 |
| 2,322,895 | Steensen | June 29, 1943 |
| 2,328,604 | Bicknell | Sept. 7, 1943 |
| 2,386,669 | Ericson | Oct. 9, 1945 |

FOREIGN PATENTS

| Number | Country | Date |
|--------|---------|------|
| 363,439 | Great Britain | Dec. 24, 1931 |